United States Patent [19]
Brody

[11] 3,812,617
[45] May 28, 1974

[54] FLOWER BASKET WITH WATER RECEPTACLE AND DETACHABLE HANDLE

[75] Inventor: Ernest O. Brody, Cleveland, Ohio

[73] Assignee: Lancaster Colony Corporation, Columbus, Ohio

[22] Filed: Jan. 31, 1973

[21] Appl. No.: 328,463

[52] U.S. Cl.................. 47/41, 47/41.11, 47/41.12, 220/94 R, D9/247
[51] Int. Cl............................................. A47g 7/06
[58] Field of Search .......................... 47/41–41.13, 47/34; 220/94 R; D9/247; 150/48; 229/52 A; 16/114, 125

[56] References Cited
UNITED STATES PATENTS

| D114,744 | 5/1939 | Bittel................................. D9/247 |
| D114,780 | 5/1939 | Bittel................................. D9/247 |
| D114,781 | 5/1939 | Bittel................................. D9/247 |
| 2,014,976 | 9/1935 | Munk............................... 47/41.12 |
| 3,336,697 | 8/1967 | Davis............................... 47/41.12 |
| 2,818,681 | 1/1958 | Coplen.......................... 47/41.12 X |
| 2,951,615 | 9/1960 | Crane................................ 220/94 R |

OTHER PUBLICATIONS
Skalny Quality Baskets, 1966, page 18.

Primary Examiner—Robert E. Bagwill
Attorney, Agent, or Firm—Mahoney, Miller & Stebens

[57] ABSTRACT

A flower basket is provided having an integrally-formed, water impervious receptacle and a detachable handle structure. The receptacle formed on a side wall of the basket is open-topped and incorporating hooks releasably engageable with wire-mesh cover for retaining a porous florist oasis within the receptacle thereby better supporting flowers in a desired arrangement. The handle is of the bail-type having terminal end portions specifically configured to interlockingly interfit with respective complemental sockets formed at opposed points on the main body of the basket. A base structure is provided to maintain the basket in either an upright position or in a tilted position with the receptacle opening vertically upward.

7 Claims, 8 Drawing Figures

PATENTED MAY 28 1974  3,812,617

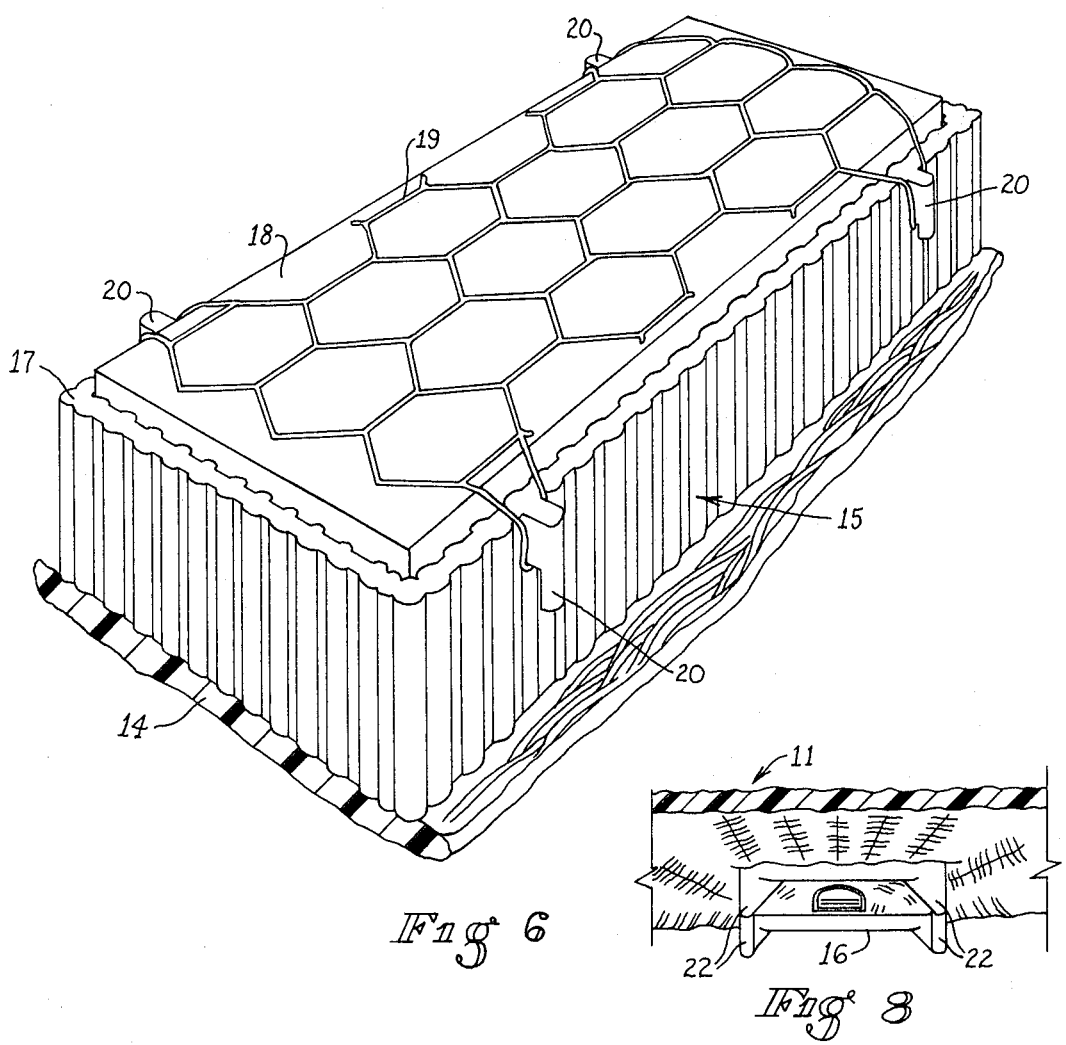
Fig 6
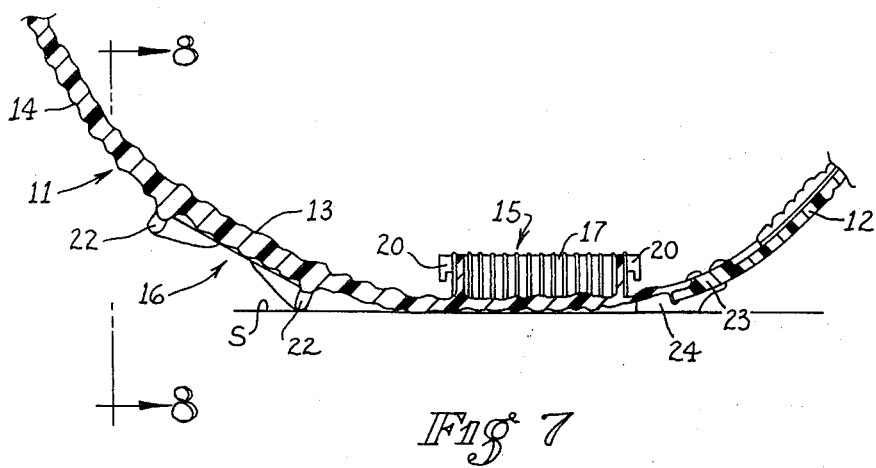
Fig 8
Fig 7

FLOWER BASKET WITH WATER RECEPTACLE AND DETACHABLE HANDLE

BACKGROUND OF THE INVENTION

Flower baskets of the general form of this novel basket have been devised but the known prior art baskets are of a woven wicker construction. They are of a unitary construction having a handle integrally woven with an arcuate, channel-form main body. A major disadvantage of the prior art baskets is that they are only useful in carrying of cut flowers that are merely laid horizontally on the bottom. Another major disadvantage is that these woven wicker baskets are relatively bulky for purposes of packaging and transport as a consequence of the integrally woven handle and main body. As a consequence, such prior art baskets have not been desired for use by florists.

SUMMARY OF THE INVENTION

The flower basket of this invention is fabricated from a thermosetting resin material by a molding operation and is formed in two parts, a main body and a handle. Integrally formed with the main body is a water impervious receptacle comprising an upstanding peripheral wall with the circumscribed sidewall portion of the main body forming the receptacle's bottom. While the main body is not otherwise designed to be water impervious as to more closely simulate the woven wicker construction, that portion of the side-wall circumscribed by the receptacle wall is impervious to water as is the receptacle wall.

Several hook-form projections are integrally molded with the receptacle wall in relatively spaced relationship around its exterior. These projections are adapted to cooperatively engage a wire-mesh cover that may be placed over the open top of the receptacle and securely retain a florists' oasis within the receptacle. This structure permits positioning of flowers in an upright arrangement when the basket is placed in a tilted position against one side. Water may then be placed in the receptacle to maintain and preserve the freshness of the flowers.

A base structure is also provided on the bottom surface of the basket's main body. This base structure is configured to permit selective positioning of the basket either upright or tilted over on one side and maintenance of the basket in the selected position.

Packaging and transport of the baskets of this invention is enhanced through provision of the detachable handle structure. With the handle removed, several basket bodies may be readily stacked with a substantial conservation of space. The several stacked basket bodies may be easily packaged with their respective detached handles resulting in economy of transportation or storage space. A novel interlocking socket and tongue arrangement is provided to easily permit secure attachment of the handles with respective basket bodies.

These and other objects and advantages of this invention will be readily apparent from the following detailed description of an embodiment thereof and the accompanying drawings.

DESCRIPTION OF THE DRAWING FIGURES

FIG. 6 is a perspective view on an enlarged scale of the receptacle with a florist oasis and a wire-mesh cover.

FIG. 7 is a fragmentary medial transverse sectional view on an enlarged scale taken along line 7—7 of FIG. 1.

FIG. 8 is a fragmentary elevational view of the basket taken on a plane extending along line 8—8 of FIG. 7.

DETAILED DESCRIPTION OF THE ILLUSTRATIVE EMBODIMENT

Figure 1:
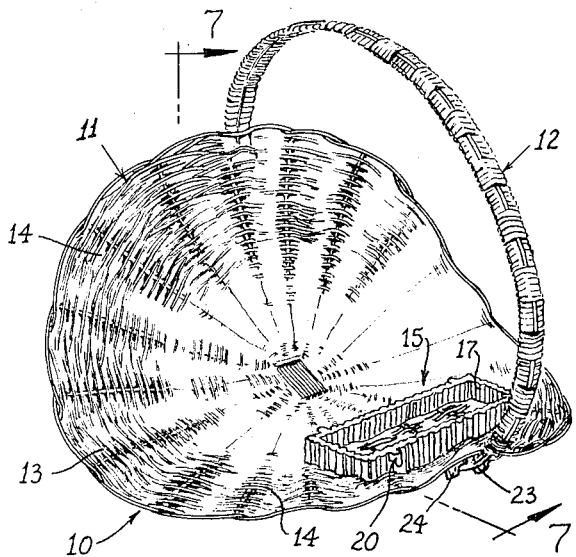
FIG. 1 is a perspective view of a basket embodying this invention with the handle attached.

A basket 10 including a main body 11 and a detachable handle 12 embodying this invention is shown in FIG. 1 with the handle interlockingly assembled with the body. The main body 11 is of arcuate, channel form having a central base section 13 and opposed, upwardly diverging side walls 14. Integrally formed with the main body 11 is a water impervious receptacle 15 and a base structure 16, which base structure is shown in FIGS. 7 and 8.

The basket of this invention is advantageously formed from a material capable of being molded into the desired configuration. In this instance, the configuration is closely simulative of the prior art woven wicker construction in general ornamental appearance as to both the main body 11 and handle 11.

Formed on an inwardly facing surface of one side wall 14 is an upstanding rib 17 functioning as a peripheral wall of the receptacle 15. The upstanding rib 17 is integrally formed with the side wall and is preferably provided with a fluted surface ornamentation that substantially matches and blends with the simulative woven wicker construction. While the major portion of the main body 11 is not necessarily formed to be impervious to water, that portion of the side wall 14 circumscribed by the upstanding rib 17 or peripheral wall must be impervious to water as must the peripheral wall with which it cooperates in forming the receptacle 15. When the basket 10 is disposed in the tilted position shown in FIGS. 1 and 7, the rib 17 will be vertical and the receptacle will thus be capable of retaining a quantity of water.

Support of cut flowers (not shown) in an upright arrangement within the receptacle 15 is made possible through use of a florist's oasis 18 as shown in FIG. 6. The receptacle is shown substantially by itself for convenience of illustration with the oasis 18 being of rectangular block form and preferably dimensioned to effectively fill the receptacle's interior. As is well known, an oasis 18 of this type is porous and formed from a material into which the stems of cut flowers may be easily inserted.

Additional stability for a flower arrangement is obtained through attachment of a wire-mesh cover 19 to the top of the receptacle 15. In the illustrative embodiment, the cover 19 is substantially coextensive with the open top of the receptacle and the florist oasis 18 and is secured in the desired position by interengagement of portions of the wire mesh with several hook-form projections 20. The receptacle is provided with four such projections 20 integrally formed with the peripheral wall 17 on the exterior thereof and which are disposed in opposed pairs. Each of the projections 20 is located adjacent the upper edge of the peripheral wall and opens downwardly relative to the wall so that the wire-mesh cover 19 may be looped under the projections and thereby maintain the cover in securing engagement with the florist's oasis 18.

Maintenance of the basket 10 in either an upright position (not shown) or tilted over on one side as shown in FIG. 1 is effected by a base structure 16 shown in FIGS. 7 and 8. This base structure 16 is formed on the central bottom surface portion of the basket's main body 11 and comprises an integrally molded set of four legs 22 arranged in a rectangular configuration. When the basket 10 is disposed in the illustrated tilted position, only two of the legs 22 will be in contacting engagement with a supporting suface S on which the basket may be placed. As best seen in FIG. 7, the side wall 14 will also be in contacting engagement with the surface S, in at least one area, resulting in maintenance of the basket in a relatively stable position. As previously noted, the receptacle 15 will be oriented with its top opening vertically upward and in proper position to receive a florist's oasis and support a cut-flower arrangement while retaining a quantity of water. Revolving the basket 10 in a counterclockwise direction, as viewed in FIG. 7, until all four legs 22 are in contact with the surface S, will result in maintenance of the basket in a stable, upright position.

The handle 12 is an elongated, relatively flat strip of material also molded to have a surface configuration simulative of wicker material. Each terminal end portion 23 of the handle is specifically configured to interlockingly interfit with respective complemental sockets 24. These sockets 24 are integrally formed on the exterior surfaces of the respective side walls 14 at the central upper edge portion thereof. The terminal end portions 23 and sockets 24 are configured so that each handle 12 may be readily assembled with a respective basket body 11 and, when so assembled, will be securely maintained in assembled relationship.

The specific configuration of the terminal end portions 23 and sockets 24 providing this advantageous construction is clearly illustrated in FIGS. 2 - 5. Each terminal end portion 23 is provided with a pair of oppositely directed, laterally extending locking lugs 25 at the extreme end thereof and which project a distance outwardly. A pair of notches 26 are also formed in the terminal end portion at a position relatively inward of the lugs 25. The pairs of notches 26 are formed in opposed side edges of the handle and open outwardly. The handle thickness at the extreme end adjacent the lugs 25 is also of relatively reduced thickness than at the notches 26 which is produced by a chamfered or curved surface 27. This permits the socket 24 to be partially recessed into the side wall 14 to minimize outward projection and more closely simulate a woven wicker basket.

Each socket 24 extends longitudinally in alignment with the handle axis and is open at both its ends as well as opening outwardly of the basket sidewalls 14 to permit insertion of the handle's terminal end portions 23. The sockets have side walls 28 that are substantially straight and parallel with each other so that straight side edge portions 29, formed on the edge of the handle between the notches 26 and lugs 25, will be closely thereagainst when the handle terminal end portion 23 is inserted into a respective socket 24. The socket side walls 28, at the inner end of the socket, are provided with laterally extending notches 30 which open inwardly towards the center of the socket and outwardly relative to a lower end of the socket. In effect, these notches provide undercut grooves for receiving the locking lugs 25 when the handle end portion 23 is inserted into the socket 24. Outwardly of the notches 30 adjacent the upper end of the socket, but spaced slightly inwardly thereof, there is provided a pair of laterally disposed, inwardly extending locking lugs 31. These lugs are formed on the socket side walls 28 and project inwardly towards each other over the socket beyond such walls. The lugs 31 are spaced from the lower end of the socket a distance less than the distance between the locking lugs 25 and the notches 26 on the handle. The inner extremities of the lugs 31 are spaced apart a distance slightly greater than the spacing of the inner ends of the notches 26 to permit passage of the handle therebetween. The notches 30 extend into the socket in the direction of its length, a distance sufficient to permit movement of the lugs 25 completely thereinto.

Figure 2:
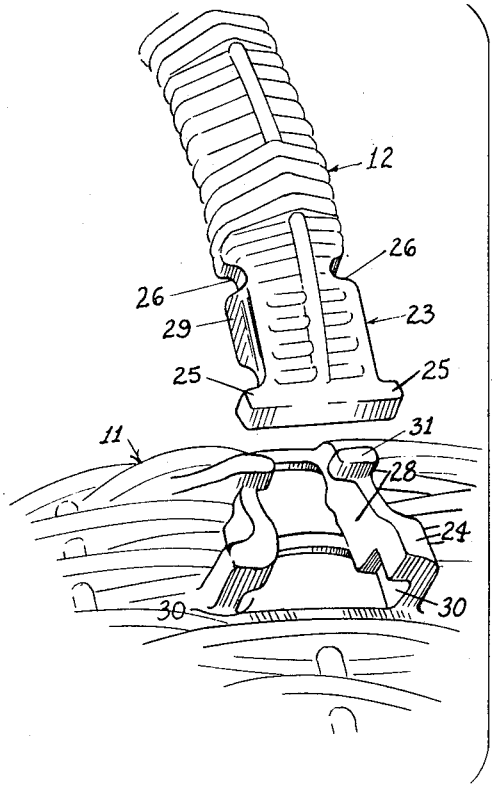
FIG. 2 is a fragmentary perspective view on an enlarged scale showing a terminal end portion of the handle disengaged from a respective socket.
Figure 3:
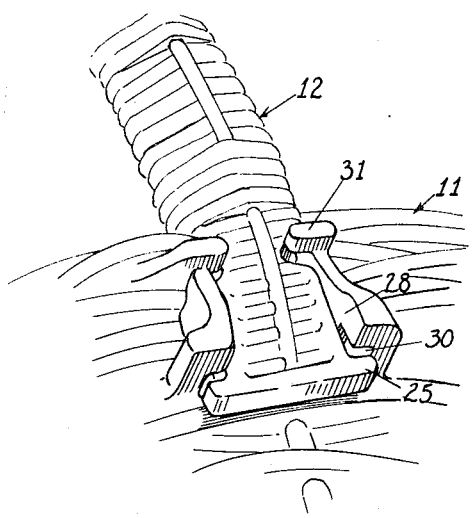
FIG. 3 is a view similar to FIG. 2 but showing the handle's terminal end portion partially inserted in the socket.
Figure 5:
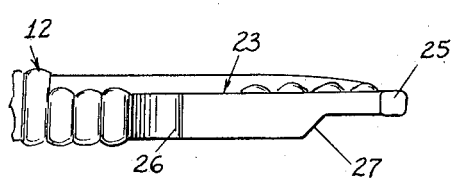
FIG. 5 is a side elevational view of the terminal end portion of the handle.
Figure 4:
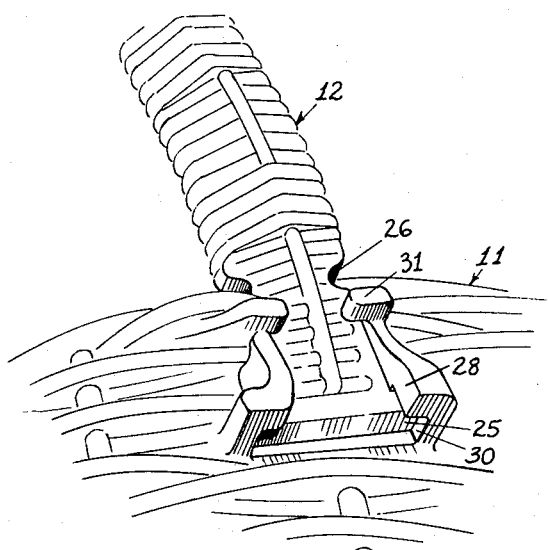
FIG. 4 is a view similar to FIGS. 2 and 3 but showing the handle's terminal end portion fully inserted into and interlocked with the socket.

In applying the handle 12 to the body 11, the terminal end portion 23 of the handle is positioned, as indicated in FIG. 2, with its center line extending longitudinally relative to the longitudinal center line of the socket 24 and with notches 26 aligning with lugs 31. The end portion 23 of the handle will be positioned outwardly of but over the socket. Then, as shown in FIG. 3, the handle end is moved inwardly toward the basket body sidewall 14 so that the notches 26 will slip over the locking lugs 31 and the locking lugs 25 will be positioned inwardly of but in the same plane as the notches 30. Next, the handle is pulled longitudinally upward to move the notches 26 upwardly beyond the locking lugs 31 so that those lugs move over the straight side edges portions 29 of the handle. Also, at the same time, the locking lugs 25 move completely into the notches 30. The thin end of the handle will permit slight downward flexing to facilitate snap movement of the lugs 25 into the notches 30 as shown in FIG. 4. The handle end portion 23 will thus be securely locked in the socket 24 since the locking lugs 25 are positioned in the notches 30 and the locking lugs 31 are positioned over the side edge portions 29. To again remove the handle, it is merely necessary to slide the handle end portion 23 longitudinally downwardly to align the notches 26 with the locking lugs 31 and to move the locking lugs 25 out of the notches 30. Then the handle end can move outwardly from the basket side wall 14 and disengage from the socket 24.

It will be readily apparent from this detailed description of an embodiment of this invention that a novel flower basket of unique construction is provided. The basket is readily fabricated by molding operations since the handle and main body are separable elements and storage and transportation costs are minimized by this two piece construction. The base structure and receptacle enable the most advantageous arrangement of flowers with the receptacle capable of maintaining the freshness of the flowers and facilitating the florist's oasis with a wire mesh cover for achievement of a desired flower arrangement.

Having thus described this invention, what is claimed is:

1. A flower basket comprising;
   A. a main body of concave cross-section with opposed side walls having inner and outer surfaces and which opens at either end, said main body including,
      1. a pair of handle-receiving sockets with each socket formed with a respective side-wall and disposed relatively opposite to the other,
      2. A fluid-impervious receptacle formed with one of said side-walls on the inner surface thereof in transversely offset relationship to a longitudinal center-line of the main body, said receptacle having a peripheral wall disposed in upstanding relationship to the inner surface of said sidewall, and
      3. a base structure formed centrally with the main body on the exterior surface thereof in predetermined relationship to said receptacle to maintain the one sidewall with said receptacle in a position with said receptacle in a substantially horizontal plane, and to alternatively maintain the main body in an upright position with both sidewalls projecting upwardly, and
   B. an elongated handle formed with terminal end portions configured to interlockingly interfit with said sockets.

2. A flower basket according to claim 1 wherein said receptacle peripheral wall is formed with a plurality of spaced apart hook-form projections, each of said hook-form projections opening toward said side-wall.

3. A flower basket according to claim 2 wherein each of said hook-form projections is formed on the exterior of said peripheral wall.

4. A flower basket according to claim 1 wherein said base structure includes a plurality of legs relatively disposed to each other to form a stable base to alternatively maintain the basket in an upright position.

5. A flower basket according to claim 1 wherein said terminal end portions are each provided with a pair of laterally extending, opposed locking lugs projecting outwardly from said handle at its extreme end and a pair of notches formed in opposed sides of said handle in spaced relationship to said locking lugs and opening laterally outward, and each of said sockets open at each end longitudinally relative to the length of said handle and open outwardly at the side relative to the surface of the respective side wall, each socket having a pair of notches to receive said handle locking lugs and a pair of locking lugs extending laterally inward over the outwardly open side of said socket, said socket locking lugs movable through said handle notches and to overlie the outer surface of said handle terminal end portion when said handle locking lugs are inserted in said socket notches.

6. A flower basket according to claim 5 wherein said handle locking lugs are of a thickness less than that of the depth of the socket notches to facilitate movement thereinto.

7. A flower basket according to claim 1 wherein said handle-receiving sockets are formed on outer surfaces of the respective side-walls.

* * * * *